United States Patent
Bombelli et al.

(10) Patent No.: US 12,468,052 B2
(45) Date of Patent: Nov. 11, 2025

(54) HYBRID INTEGRATED SILICON DRIFT DETECTOR AND METHOD FOR FABRICATION THEREOF

(71) Applicant: BRUKER NANO GMBH, Berlin (DE)

(72) Inventors: Luca Bombelli, Milan (IT); Oliver Boslau, Munich (DE); Marcus Noack, Potsdam (DE)

(73) Assignee: BRUKER NANO GMBH, Berlin (DE)

(*) Notice: Subject to any disclaimer, the term of this patent is extended or adjusted under 35 U.S.C. 154(b) by 92 days.

(21) Appl. No.: 18/288,902

(22) PCT Filed: Aug. 11, 2022

(86) PCT No.: PCT/EP2022/072539
§ 371 (c)(1),
(2) Date: Oct. 30, 2023

(87) PCT Pub. No.: WO2023/017118
PCT Pub. Date: Feb. 16, 2023

(65) Prior Publication Data
US 2024/0219588 A1  Jul. 4, 2024

(30) Foreign Application Priority Data
Aug. 13, 2021 (EP) .................................. 21191266

(51) Int. Cl.
*G01T 1/24* (2006.01)
(52) U.S. Cl.
CPC ...................................... *G01T 1/24* (2013.01)
(58) Field of Classification Search
CPC ....................................................... G01T 1/24
See application file for complete search history.

(56) References Cited

U.S. PATENT DOCUMENTS

2002/0139970 A1* 10/2002 Iwanczyk ............. H10F 30/225
257/E31.063
2009/0026569 A1   1/2009 Dongliang
(Continued)

FOREIGN PATENT DOCUMENTS

CN   111 473 792 A   7/2020
JP   2014-013894 A   1/2014
(Continued)

OTHER PUBLICATIONS

International Search Report dated Nov. 21, 2022, in connection with PCT International Application No. PCT/EP2022/072539.
(Continued)

*Primary Examiner* — Hugh Maupin
(74) *Attorney, Agent, or Firm* — Norris McLaughlin, PA

(57) ABSTRACT

The present invention refers to a hybrid integrated silicon drift detector (HiSDD) for X-ray detection, particularly to a HiSDD combining a silicon drift detector (SDD) with a low-noise preamplifier on a SDD sensor chip to improve the electrical and structural properties of the detector assembly. The invention further refers to a corresponding method for the fabrication of a HiSDD. A HiSDD according to the invention hybridly integrates a silicon drift detector, SDD, sensor chip and a preamplifier module; wherein electrically conductive paths are formed on a surface of the SDD sensor chip, having first ends configured for flip chip bonding and second ends configured for wire bonding; wherein the preamplifier module having contacts disposed on a surface of the preamplifier module, and wherein the first ends of the electrically conductive paths are flip chip bonded to the contacts of the preamplifier module.

13 Claims, 3 Drawing Sheets

(56) References Cited

U.S. PATENT DOCUMENTS

| | | | |
|---|---|---|---|
| 2013/0341752 A1 | 12/2013 | Kostamo | |
| 2014/0306120 A1* | 10/2014 | Li | G01T 1/02 |
| | | | 250/394 |
| 2015/0030132 A1 | 1/2015 | Nashashibi | |
| 2019/0363204 A1* | 11/2019 | Andersson | H10F 77/93 |
| 2021/0335866 A1* | 10/2021 | Hall | G01T 1/241 |
| 2022/0093814 A1 | 3/2022 | Matsunaga et al. | |

FOREIGN PATENT DOCUMENTS

| | | |
|---|---|---|
| JP | 2017-098996 A | 6/2017 |
| WO | 2020/162246 A1 | 8/2020 |

OTHER PUBLICATIONS

Written Opinion in connection with PCT International Application No. PCT/EP2022/072539.

\* cited by examiner a)

b)

c)

HYBRID INTEGRATED SILICON DRIFT DETECTOR AND METHOD FOR FABRICATION THEREOF

This application is the U.S. National Stage of International Application No. PCT/EP2022/072539, filed Aug. 11, 2022, which claims foreign priority benefit under 35 U.S.C. § 119 of European Patent Application No. 21191266.2, filed Aug. 13, 2021, the disclosures of which are incorporated herein by reference.

The present invention refers to a hybrid integrated silicon drift detector (HiSDD) for X-ray detection, particularly to a HiSDD combining a silicon drift detector (SDD) with a low-noise preamplifier module on an SDD sensor chip to improve the electrical and structural properties of the detector assembly. The invention further refers to a corresponding method for the fabrication of a HiSDD.

TECHNOLOGICAL BACKGROUND AND PRIOR ART

Energy dispersive spectroscopy (EDS, also called EDX) is the probably most commonly used X-ray analytic technique for characterizing the elemental composition of a sample based on characteristic X-rays emitted by the sample after being excited by an incident electron beam. EDS measurements are commonly carried out within electron microscopes (EM), such as e.g., scanning electron microscopes (SEM), which comprise suitably configured EDS detectors inside a measurement chamber of the electron microscope. In the EM, the EDS detectors are often arranged upstream of the sample in the propagation direction of the electron beam.

With solid state EDS detectors, the energy of an incoming X-ray photon can be measured by the amount of charge carriers caused by pair generation when it is absorbed inside the sensitive region of the detector material. For high-resolution X-ray spectroscopy Si(Li) detectors can be used. An alternative to Si(Li) detectors are high-resolution and high-rate silicon drift detectors (SDDs). The basic structure of an SDD corresponds to a p-n-photodiode comprising a highly $p^+$-doped first region and moderately n-doped second region. The detector is typically operated in reverse direction to extend the existing space charge zone and to avoid a recombination of the generated charge carriers. By superimposing a second voltage on the space charge zone, the charge carriers can drift in a controlled manner to a corresponding contact region, where they can be fed to an amplifier circuit or evaluation electronics. In some types of SDDs, several $p^+$-doped drift ring regions are arranged with increasing diameter as circular rings around a small $n^+$-doped anode in the centre of the sensor chip.

SDDs offer a high signal-to-noise ratio (SNR) that allows operation with moderate cooling compared to Si(Li) detectors. Furthermore, due to the small contact region (e.g. an anode region) in the centre of the sensor chip, their electric capacitance is low and high response times can be realized. For readout, one or more transistors that serve as preamplifiers can be directly integrated on the wafer. As a result, a preamplifier, such as e.g., a low-noise junction-gate field effect transistor (JFET), can sit closer to the detector material than in Si(Li) detectors, which in turn enables better electronic evaluation. A drawback of such directly integrated front-end field effect transistor (FET) approaches is that the electronic integration is technologically challenging and the rejection rate may be higher compared to non-amplified sensor chips. Therefore, external preamplifiers, such as e.g., low-noise external JFETs or CMOS-based charge preamplifiers, are often preferred for disentangling the technology process for the sensor chip from the manufacturing of a suitable front-end FET.

An external preamplifier may be based on an integrated circuit (IC). In order to keep the sensitivity to capacitances of the wire bond connection low, the external preamplifiers are typically separate modules which are arranged in closest proximity to the contact region of the SDD sensor chip via short bond wires, i.e., the input of the external preamplifier is connected to the output of the SDD sensor chip with a short bond wire. Further contacts of the detector and the preamplifier can be connected to a common printed circuit board (PCB) substrate also with bond wires. The PCB substrate can then be connected to a housing of the resulting detector module.

A disadvantage of said external approaches is, beside a complicated and time-consuming bonding process on very small bond pads (preferred for low electric capacitances), that the wire bond connection between the input of the preamplifier and the output of the SDD sensor chip also has a capacitance which further increases the serial noise of the detector signal. Further, the free bond wires tend to mechanically oscillate and produce a so-called pick-up noise in the output signal. In summary, the electronic noise in the detector is increased by said wire bond connections.

It is thus an object of the invention to overcome or reduce at least some of the disadvantages of the prior art and to provide an SDD connected an external preamplifier which is insensitive to capacitances of the connection and provides better immunity to pick-up noise. An external preamplifier can be used to keep the complexity and the manufacturing costs of the SDD system low. Further, an improved method for connecting an SDD to an external preamplifier shall be provided, which allows for a simple and reliable connection of the two components.

DESCRIPTION OF THE INVENTION

The objective of the invention is solved and the disadvantages of the prior art are overcome, at least partially, by a HiSDD of claim 1 and a corresponding method for fabrication a HiSDD. The dependent claims are directed to preferred embodiments of the present invention.

An aspect of the invention relates to a hybrid integrated silicon drift detector, HiSDD, comprising: a silicon drift detector, SDD, sensor chip with a first surface configured to be exposed to incident radiation and with a second surface opposite to the first surface, wherein a contact region and a plurality of drift ring regions are arranged in the second surface of the sensor chip, the contact region being spaced apart from and forming a common central region for the drift ring regions, wherein a contact is formed above the contact region, is electrically conductively connected to the contact region and is configured for flip chip bonding (e.g. by providing correspondingly spaced contact pads), and wherein electrically conductive paths are formed on the second surface, are isolated from the contact region and the drift ring regions, and having first ends configured for flip chip bonding (e.g. by providing correspondingly spaced contact pads) and second ends configured for wire bonding (e.g. by providing correspondingly large bond pads); and a preamplifier module having contacts disposed on a single surface of the preamplifier module, wherein the first ends of the electrically conductive paths and the contact are flip chip bonded to the contacts of the preamplifier module.

The drift ring regions may be formed as individual circular rings with increasing diameter having the contact region in a common centre. Thereby, a ring is in principal understood as a closed loop, however, a part of a ring can be omitted. The ring is then an open ring or in short it is opened. A ring may be structurally deformed. For example, the drift ring regions can have an elliptical or drop-like ring shape. The size of the deformed rings may increase from one ring to the next. The contact region is forming a common central region for the drift ring regions, which means that the contact region is enclosed by rings formed by the drift ring regions. For drift ring regions having a drop-like ring shape it is preferred that the contact region is formed in a common region where all drop-shapes converge. A drop-shaped design allows to remove the contact region from the centre of the SDD senor chip towards the edges of the SDD senor chip. The replacement may be useful to prevent possible radiation induced damages in a HiSDD according to the invention. Furthermore, the size of the contact region can be reduced compared to circular ring structures.

In a preferred embodiment of the present invention, the HiSDD further comprises a holder configured for supporting the SDD sensor chip, wherein the second ends of the electrically conductive paths are wire bonded to contact areas on the holder. The holder may be a holding substrate, frame, support or the like. Preferably, the holder comprises a wireframe that provides electrically conductive connections at the holder.

Preferably, the SDD sensor chip comprises a chip substrate of a semiconductor material with a first doping type, the chip substrate preferably being a $n^-$-doped semiconductor material. The contact region may be highly doped with the first doping type. The contact region is preferably $n^+$-doped. The plurality of drift ring regions may be doped with a second doping type. The plurality of drift ring regions is preferably $p^+$-doped.

In a preferred embodiment of the present invention, the HiSDD further comprises an insulation layer covering the second surface of the SDD sensor chip, wherein the contact is electrically conductively connected to the contact region through an opening in the insulation layer. The electrically conductive paths are formed above the insulation layer.

In a preferred embodiment of the present invention, the HiSDD further comprises at least one drift ring contact formed above the insulation layer, wherein drift ring contacts are electrically conductively connected to corresponding drift ring regions through second openings in the insulation layer, wherein at least one drift ring contact includes an electrically conductive path formed above the insulation layer.

In a particularly preferred embodiment of the invention, a hybrid integrated silicon drift detector, HiSDD, hybridly integrates: a silicon drift detector, SDD, sensor chip comprising: a chip substrate of a doped semiconductor material; a contact layer on a first surface of the chip substrate, wherein the doping (doping type) of the contact layer is opposite to the doping of the semiconductor material of the chip substrate; a contact region preferably formed as a trench-shaped structure and arranged in a second surface of the chip substrate opposite to the first surface, wherein the doping of the contact region is higher than the doping of the semiconductor material of the chip substrate; a plurality of drift ring regions preferably formed as trench-shaped structures and arranged in the second surface of the chip substrate opposite to the first surface of the chip substrate with the contact region as common centre, wherein the drift ring regions and the contact region are spaced apart from one another, wherein the doping of the drift ring regions is opposite to the doping of the semiconductor material of the chip substrate; an insulation layer covering the second surface of the chip substrate; a contact formed on top of the insulation layer and electrically conductively connected to the contact region through a first opening in the insulation layer; and at least one drift ring contact formed on top of the insulation layer, wherein drift ring contacts are electrically conductively connected to corresponding drift ring regions through second openings in the insulation layer; and a preamplifier module having contacts disposed on a single surface of the preamplifier module. The contact is formed for flip chip bonding directly above the first opening and the underlying contact region; the SDD sensor chip is further comprising electrically conductive paths formed on top of the insulation layer, wherein first ends of the electrically conductive paths are formed for flip chip bonding (e.g. by providing correspondingly spaced contact pads) and second ends of the electrically conductive paths are formed for wire bonding (e.g. by providing correspondingly large bond pads); wherein the contacts of the preamplifier module are formed for flip chip bonding (e.g. by providing correspondingly spaced contact pads); and wherein the first ends of the electrically conductive paths and the contact are flip chip bonded to the contacts of the preamplifier module.

The signal input of the preamplifier module may be directly connected to the signal output (i.e. to the contact region) of the SDD sensor chip via a flip chip bond. However, a preamplifier module typically requires a plurality of inputs and outputs, for example, a signal output for the amplified input signal, one or more voltage inputs, and a ground potential (GND) contact. All or at least some of the contacts of the preamplifier module may be connected directly via flip chip bonds (e.g. with solder bumps or stud bumps between opposing contact pads) to corresponding contact pads on the SDD sensor chip. These contact pads can be connected via electrically conductive paths to further contact pads (e.g. bond pads) that are outside the region which is covered by the flip chip bonded preamplifier module. These so-called second ends of the electrically conductive paths can then be connected to corresponding contact areas on the holder via wire bonds.

However, while in conventional prior art SDDs the external preamplifier is arranged outside the axis of detection, in the present invention the preamplifier module is arranged directly in or at least near the centre of the sensitive region of the SDD sensor chip where the X-ray photons are incident from the opposite side. In the prior art, the preamplifier module is typically at least partly protected against photon-induced ionisation caused by high-energetic X-ray photons from a carrier substrate on which the SDD sensor chip and the external preamplifier module are separately combined. However, due to the high photon conversion rate of actual SDD sensor chips, most of the incoming X-ray photons are converted into electron-hole pairs such that almost no photon is transmitted through the sensitive region of the SDD sensor chip. Therefore, if the intensity of incident photons does not exceed a permissible limit for detection, an external preamplifier can also be used directly behind the sensitive region of the SDD sensor chip.

An SDD sensor chip and an external preamplifier module are known to the skilled person. Further known to the skilled person is the flip chip bonding method which is typically carried out via a welding process in which metal bumps are applied to one of the contacts to be connected before they are opposed and connected to one another by heating the metal bumps. The term hybrid integration is particularly understood as a fabrication approach in which functionally different elements are separately provided and combined on a common platform to provide a single element with increased functionality but still on the single component level. A close and short-range combination of an SDD sensor chip with an associated preamplifier is particularly preferred for circuit reasons and provides many advantages compared to conventional approaches.

Because the contact is directly connected to the input of the preamplifier module by a flip chip bond, the distance between the contact region of the SDD sensor chip and a first FET of the preamplifier is minimized. A short distance means that the electric capacitance of the connection can also be very low. Due to a low electric capacitance, low time constants for a HiSDD can be realized, which allow a fast response time and a large detection bandwidth. A large detection bandwidth is preferred for detecting X-ray radiation with rapidly changing intensity. Due to the longer wire bond connection, the electric capacitance of the connection between an SDD sensor chip and external preamplifiers of the prior art is much higher, thus resulting in a reduced detection bandwidth of a corresponding SDD module. Furthermore, the free bond wires SDD-based detector modules of the prior art tend to mechanically oscillate and can produce a so-called pick-up noise in the output signal. By replacing at least the main bond wire between the contact region and the preamplifier input by a stable and robust flip chip bond, possibly occurring mechanical instabilities are avoided and the electric properties can be stabilized.

There are further advantages from the fabrication point of view. Even with SDD modules of the prior art, attention is already being taken to ensure a shortest possible connection to the preamplifier with low electrical capacitance. This can be achieved, among other things, by minimizing further sources of electric capacitances, which also means, that the surfaces of contacts and the corresponding contact pads are typically minimized in their size. However, establishing the connecting bond wires becomes increasingly difficult and challenging as the structures to be connected become smaller.

In contrast, with the flip chip method of the present invention, the main bond wire between the contact region of the SDD sensor chip providing the signal output and the preamplifier signal input can be replaced by an ultrashort stable and mechanically robust connection. Furthermore, due to the use of electrically conducting paths for less electrically critical other connections, more appropriate contact schemes with distantly spaced contacts and larger contact pads can be realized. Both, replacing the main wire bond by a flip chip bond and allowing more distantly spaced contacts on the SDD sensor chip, highly simplifies the processes during fabrication and in particular the still involved bonding processes. This also applies to the structures on a holder, which can also be simplified because the attachment of the external preamplifier (e.g. by glue) can be avoided. Instead, the attachment process to the SDD sensor chip already includes the formation of conductive connections and in particular the formation of the main connection between the contact region and the preamplifier input.

An SDD sensor chip comprising drift ring regions which are preferably circularly arranged around a central contact region as signal output allows to define the drifting properties of the generated charge carriers. When X-ray photons are absorbed in the depletion zone of the substrate, electron-hole pairs are generated and separated by the applied reverse voltage. By applying a second voltage on the space charge zone via drift ring regions, the charge carriers can drift in a controlled manner to the contact region. With such SDD sensor chips, the electrical signals are collected in the centre of the SDD sensor chip on only a small contact region of low electrical capacitance. The drift ring regions can be supplied with a common drift ring voltage or different drift ring voltages are applied. For the latter, at least some or all of the drift ring regions may provide individual drift ring contacts for connecting to appropriate drift ring voltage supplies or the rings may be electrically conductively connected by a voltage divider circuit, e.g., by including resistive elements between different drift ring structures.

A preamplifier module may comprise a FET, such as e.g., a low-noise JFET, as an input transistor which gate is directly connected to the signal input of the module. Preferably, the preamplifier module may be a preamplifier chip having contacts disposed on a surface of the preamplifier chip. For example, a preamplifier chip may be a bare chip or bare die including at least one FET. A preamplifier module or chip may be provided in a package (e.g. a chip carrier package or a system in a package, SiP). A preamplifier module provided in a package may have the respective contacts for flip-chip bonding disposed on a surface of the package. A preamplifier module having contacts disposed on a surface of the preamplifier module is preferred because preferably all contacts should be connected at once by a planar flip chip bonding process without requiring further wire bond or other connections. Another advantage of flip chip bonding is the inherent protection of the bonds. While wire bonds are mechanically sensitive to stress and shock, the flip chip bonds are intrinsically stable and covered by the bonded components and thus less sensitive to such mechanical impacts. All contacts may be disposed on a single surface the preamplifier module, however, some of the contacts may be disposed on other surfaces of the preamplifier module.

A preamplifier module may further comprise a temperature sensor which is integrated in the preamplifier module. For example, the temperature sensor may be an NTC or a semiconductor temperature sensor (e.g. a silicon bandgap temperature sensor). Preferably, the temperature sensor may be an integrated element of a preamplifier chip. The integration of a temperature sensor in the preamplifier module allows a more direct sensing compared to prior art methods were the temperature is measured by external components. Since in the present invention the amplifier is brought very close to the radiation detection area and in direct contact with the SDD sensor chip, the preamplifier module is more affected by rapid temperature changes, e.g., when the intensity of incident radiation varies. An integrated temperature sensor therefore allows to improve the quality of a temperature control.

The electrically conductive paths, which are preferably formed above or on top of an insulation layer, allow spreading the close contacts of the preamplifier module over a wide area. These additional contacts, which may include a signal output, GND or reference potential contact, multiple inputs etc., are much less sensitive to electric capacitances and influences causing to electronic noise. Therefore, corresponding bond pads can be larger in size compared to conventional wire bond pads on SDD sensor chips for connecting to an external preamplifier of the prior art. Larger bond pads highly simplify the bonding process because higher tolerances can be accepted within the process.

The contact layer and the contact region as well as the plurality of drift ring regions can be structured by various methods known to the skilled person. For example, impurity atoms can be doped, infused or (ion) implanted into these regions. For a spatially selective modification, masking techniques may be applied. The contact layer or the different regions can also be provided by deposition methods. With masking techniques, the modified regions may be formed as trench-shaped structures which show a more or less rectangular depth profile.

Preferably, an insulation layer is a dielectric layer such as a $SiO_2$, $SI_3N_4$, $Al_2O_3$, $TiO_2$ or $ZrO_2$ layer or a combination thereof. The dielectric layer covers and protects the contact region and the plurality of drift ring regions in the second surface of the substrate. Preferably, contacts are formed as metal contacts, wherein the metal is selectively deposited by methods known to the skilled person. In particular, the contacts can be Al, Ag, Cu, Au or poly-Si contacts. A HiSDD according to the invention may comprise one or more additional layers. These layers may include but are not limited to at least one passivation layer, at least one additional insulation layer and conductive paths distributed over different layers. A passivation layer may be, for example, a $SiN_x$, $SiO_x$, $Si_x$ or polymer layer.

In a preferred embodiment of the present invention, the HiSDD further comprises a holder configured for supporting the SDD sensor chip and the preamplifier module at a first surface of the holder, wherein the second ends of the electrically conductive paths are wire bonded to connect to corresponding contact pads on the holder. A holder may provide a stable and robust platform for further assembling steps in, e.g., end user and industrial applications, for embedded use or for improved handling aside from wafer level.

In a preferred embodiment of the present invention, the chip substrate is a $n^-$-doped semiconductor material. In a particularly preferred embodiment of the present invention, the contact layer is $p^+$-doped and the contact region is $n^+$-doped. Preferably, the drift ring regions are $p^+$-doped. In an $n^-$-doped semiconductor material comprising a contact layer as $p^+$-doped surface cathode layer and the contact region as $n^+$-doped anode region, electrons are collected at the anode while the holes of a created electron-hole pair are diffusing to the cathode. However, the structuring of the SDD sensor chip and the doping of the individual regions may be modified as known to the skilled person.

In a preferred embodiment of the present invention, the drift ring regions and the contact region are each equally spaced apart from one another along an axis parallel to the substrate. An equal spacing simplifies the resulting electric field when different drift rings voltages (second voltages) are applied to the individual drift ring regions. However, the spacing of the drift ring regions may be set to be different in at least some or all sections of an SDD sensor chip.

In a preferred embodiment of the present invention, at least one drift ring contact includes a conductive path formed on top of the insulation layer for a distant connection. In a HiSDD electrically conductive paths are applied on top of the insulation layer for separating the various contacts of the preamplifier module among one another and to simplify the connection process. However, the same type of electrically conductive paths can also be applied for other required connections with respect to the SDD sensor chip. In particular, also the drift ring contacts may be spaced more distant to one another and provided with larger bonding pads.

In a preferred embodiment of the present invention, a first input FET of the preamplifier module is matched to the stray capacitance of the connection to the preamplifier. Matching a first input FET to the stray capacitance of the connection to the preamplifier can be used to reduce the serial noise of the detector signal.

In a preferred embodiment of the present invention, the at least one drift ring contact forms a conductive ring on top of the insulation layer. The separate drift ring regions may already form closed electric ring circuits at the second surface of the substrate. These electric ring circuits are typically connected by corresponding drift ring contacts also forming rings. For further reducing the electric resistance and to provide an equal potential in all sections of a drift ring, a closed electrically conductive ring on top of the insulation layer can additionally be provided.

In a preferred embodiment of the present invention, at least one conductive ring is opened in the region below the preamplifier module. By opening the conductive ring, the occurrence of short circuits and other electrical alternating effects which decrease the electric properties of the HiSDD can be avoided. Furthermore, the flip chip bonds process can be simplified because the heating resistance in the region below the preamplifier module is enhanced.

A further aspect of the invention relates to a HiSDD module comprising a HiSDD according to the present invention and a thermoelectric cooler thermally connected to the holder. A thermoelectric cooler is sufficient to cool a HiSDD module according to the present invention even for the detection of high-energy X-rays. Due the flip chip bonding, an increased heat transfer from the preamplifier module can be realised compared to a conventional wire bond approach. The preamplifier module can thus be directly cooled via the SDD sensor chip.

Preferably, a HiSDD module according to the present invention further comprises a circular entrance aperture for transmitting X-ray radiation, wherein the centre of the entrance aperture is located above the contact region. The aperture defines the sensitive region where X-ray radiation can be detected by the SDD sensor chip.

Another aspect of the invention relates to a method for fabricating a hybrid integrated silicon drift detector, HiSDD, according to the invention, comprising the steps of: providing the silicon drift detector, SDD, sensor chip; providing the preamplifier module; flip chip bonding the first ends of the electrically conductive paths and the contact to the contacts of the preamplifier module. The proposed method for fabricating is directly related to an above-described HiSDD module according to the present invention, therefore the defined steps are also directly related to the individual features of a HiSDD according to the present invention. Preferably, the second ends of the electrically conductive paths are wire bonded to contact areas on the holder.

All embodiments described in this specification may be advantageously combined with one another to the extent that their respective features are compatible. In particular, the expression "in an embodiment" means that the respective features may or may not be part of specific embodiments of the invention.

Further aspects and preferred embodiments of the present invention result from the dependent claims, the drawings and the following description of the drawings. Different disclosed embodiments are advantageously combined with each other if not stated otherwise.

DESCRIPTION OF THE DRAWINGS

The features of the invention become apparent to those skilled in the art by the detailed description of exemplary embodiments with reference to the attached drawings in which.

DETAILED DESCRIPTION OF THE INVENTION

Figure 1:
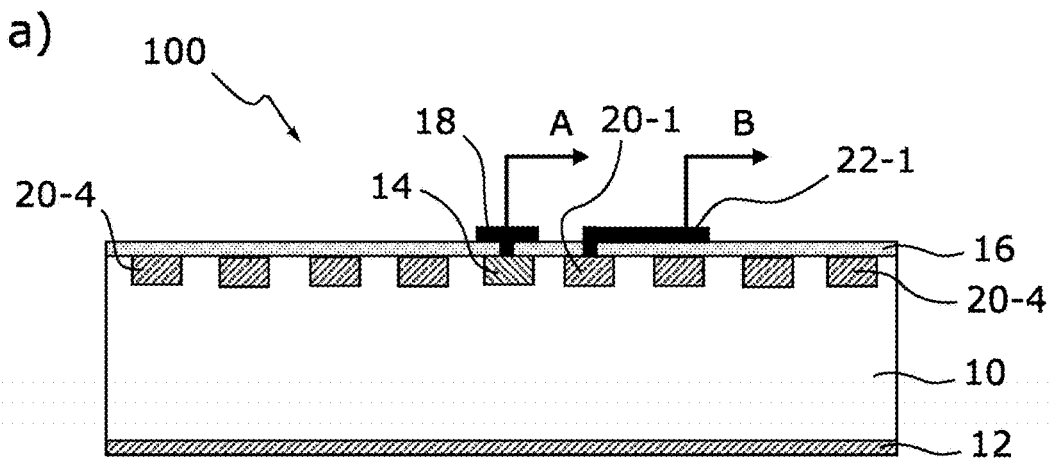
FIG. 1 schematically illustrates an exemplary embodiment of a SDD sensor chip connected to an external preamplifier module of the prior art.
Figure 1:
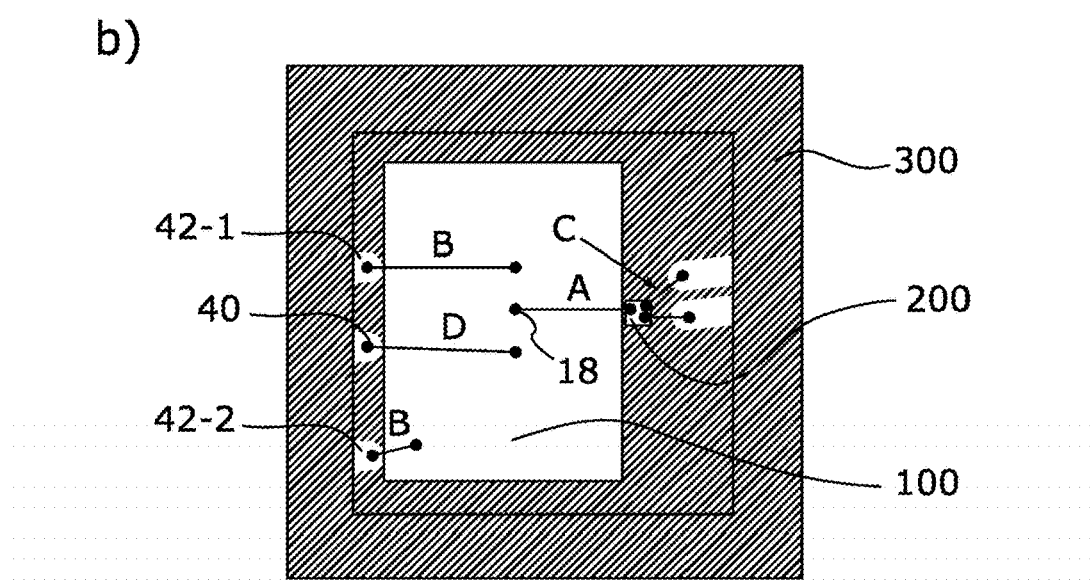
Figure 1:
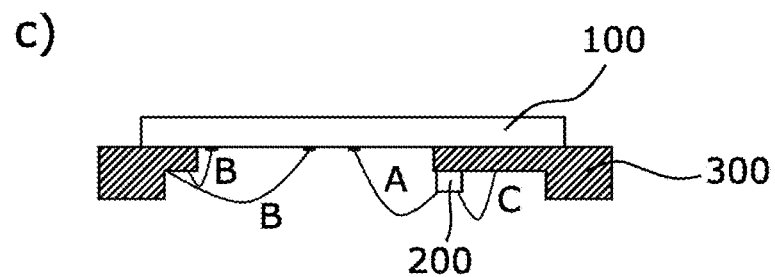

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. Expressions such as "at least one of," when preceding a list of elements, modify the entire list of elements and do not modify the individual elements of the list.

As used herein, the term "substantially", "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centred on the value.

FIG. 1 schematically illustrates an exemplary embodiment of an SDD sensor chip 100 connected to an external preamplifier module 200 of the prior art. In particular, FIG. 1a shows a cross section of a conventional SDD with circular drift ring regions 20 (e.g. 20-1 and 20-4), and FIGS. 1b and 1c show top and a side views of said conventional SDD, respectively.

The figures show different aspects of a SDD separately combining a silicon drift detector, SDD, sensor chip 100 comprising: a chip substrate 10 of a doped semiconductor material; a contact layer 12 on a first surface of the chip substrate 10, wherein the doping of the contact layer 12 is opposite to the doping of the semiconductor material of the chip substrate 10; a contact region 14 formed as a trench-shaped structure and arranged in a second surface of the chip substrate 10 opposite to the first surface, wherein the doping of the contact region 14 is higher than the doping of the semiconductor material of the chip substrate 10; a plurality of drift ring regions 20 formed as trench-shaped structures and arranged in the second surface of the chip substrate 10 opposite to the first surface of the chip substrate 10 with the contact region 14 as common centre, wherein the drift ring regions 20 and the contact region 14 are spaced apart from one another, wherein the doping of the drift ring regions 20 is opposite to the doping of the semiconductor material of the chip substrate 10; an insulation layer 16 covering the second surface of the chip substrate 10; a contact 18 formed on top of the insulation layer 16 and electrically conductively connected to the contact region 14 through a first opening in the insulation layer 16; and at least one drift ring contact 22 formed on top of the insulation layer 16, wherein drift ring contacts 22 are electrically conductively connected to corresponding drift ring regions 20 through second openings in the insulation layer 16; with an external preamplifier module 200 having contacts disposed on a single surface of the preamplifier module 200.

The contact 18 is formed for wire bonding directly above the first opening and the underlying contact region 14; the contacts of the preamplifier module 200 are formed for wire bonding; and the contact 18 is wire bonded to a signal input of the preamplifier module 200. At least some or all of the plurality of drift ring regions 20 may have individual drift ring contacts (22, e.g. 22-1). That means the contact 18 is adapted for a wire bond connection A to a preamplifier module 200, in particular to a signal input of the external preamplifier 200. The shown drift ring contact 22-1 is adapted for a wire bond connection B to a drift ring voltage supply.

The SDD sensor chip 100 and the external preamplifier module 200 can be separately combined on an appropriate holder 300 configured for supporting both components. The holder 300 may provide a connection C to a signal output of the external preamplifier 200. The holder 300 may provide further contacts for wire bonding. These further contacts may include but are not limited to contacts 40 (e.g. 40-1, 40-4) for delivering specific drift ring voltages $V_{ring}$ via separate wire bonds. Another contact 42 may provide a connection to ground potential GND.

Figure 2:
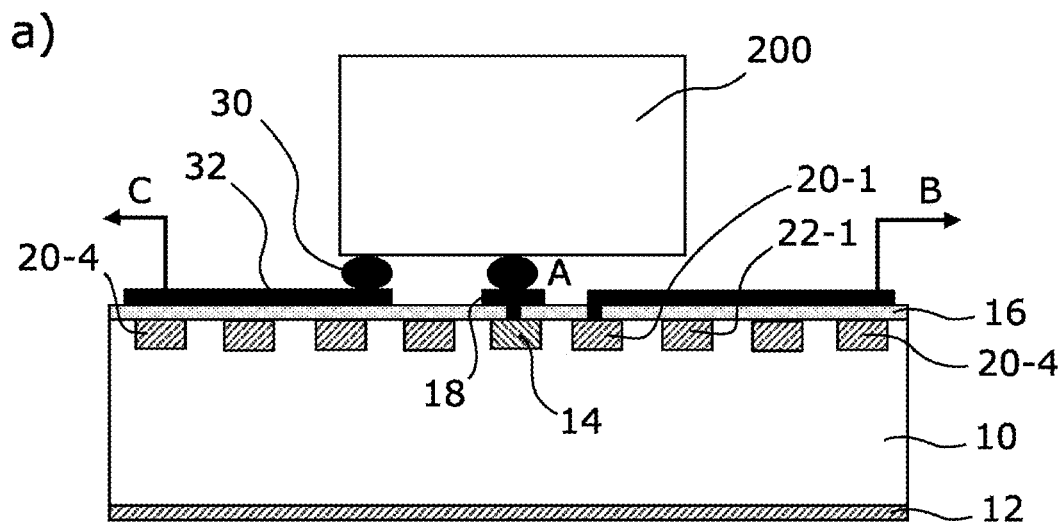
FIG. 2 schematically illustrates an exemplary embodiment of a HiSDD according to the present invention.
Figure 2:
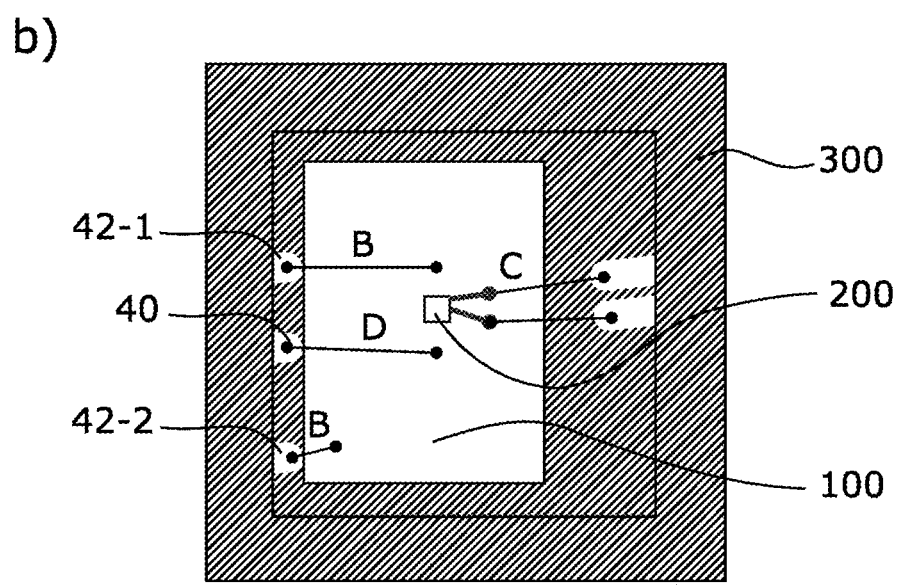
Figure 2:
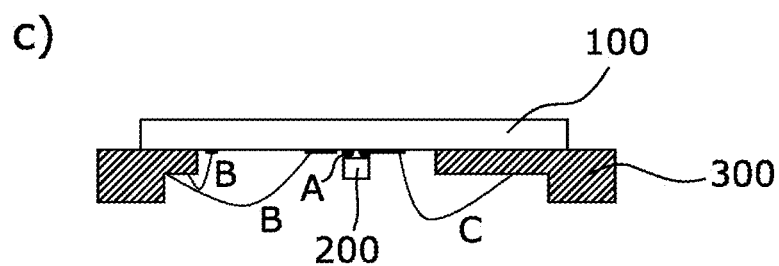

FIG. 2 schematically illustrates an exemplary embodiment of a HiSDD according to the present invention. In particular, FIG. 2a shows a cross section of a HiSDD with circular drift ring regions 20 (e.g. 20-1 and 20-4), and FIGS. 1b and 1c show top and a side views of said HiSDD, respectively.

The figures show different aspects of a HiSDD hybridly integrating: a silicon drift detector, SDD, sensor chip 100 comprising: a chip substrate 10 of a doped semiconductor material; a contact layer 12 on a first surface of the chip substrate 10, wherein the doping of the contact layer 12 is opposite to the doping of the semiconductor material of the chip substrate 10; a contact region 14 formed as a trench-shaped structure and arranged in a second surface of the chip substrate 10 opposite to the first surface, wherein the doping of the contact region 14 is higher than the doping of the semiconductor material of the chip substrate 10; a plurality of drift ring regions 20 formed as trench-shaped structures and arranged in the second surface of the chip substrate 10 opposite to the first surface of the chip substrate 10 with the contact region 14 as common centre, wherein the drift ring regions 20 and the contact region 14 are spaced apart from one another, wherein the doping of the drift ring regions 20 is opposite to the doping of the semiconductor material of the chip substrate 10; an insulation layer 16 covering the second surface of the chip substrate 10; a contact 18 formed on top of the insulation layer 16 and electrically conductively connected to the contact region 14 through a first opening in the insulation layer 16; and at least one drift ring contact 22 formed on top of the insulation layer 16, wherein drift ring contacts 22 are electrically conductively connected to corresponding drift ring regions 20 through second openings in the insulation layer 16; and a preamplifier module 200 having contacts disposed on a single surface of the preamplifier module 200.

The contact 18 is formed for flip chip bonding directly above the first opening and the underlying contact region 14; the SDD sensor chip 100 further comprises electrically conductive paths 32 formed on top of the insulation layer 16, wherein first ends of the electrically conductive paths 32 are formed for flip chip bonding and second ends of the electrically conductive paths 32 are formed for wire bonding; wherein the contacts of the preamplifier module 200 are formed for flip chip bonding; and wherein the first ends of the electrically conductive paths 32 and the contact 18 are flip chip bonded to the contacts of the preamplifier module. For flip chip bonding metal bumps 30 may be applied between opposing contacts (e.g. contact pads).

Furthermore, the figures show a holder 300 configured for supporting the SDD sensor chip 100 and the preamplifier module 200 at a first surface of the holder 300, wherein the second ends of the electrically conductive paths 32 are wire bonded to contact areas on the holder 300. Preferably, the chip substrate 10 is an n$^-$-doped semiconductor material. Preferably, the contact layer 12 is p$^+$-doped. Preferably, the contact region 14 is n$^+$-doped. The drift ring regions 20 and the contact region 14 can each be equally spaced apart from one another along an axis parallel to the substrate 10. At least one drift ring contact 22 may include an electrically conductive path 32 formed on top of the insulation layer 16 for a distant connection. Preferably, a first input FET of the preamplifier module 200 is matched to the stray capacitance of the connection to the preamplifier A. The at least one drift ring contact 22 can form a closed conductive ring on top of the insulation layer 16, wherein at least one conductive ring may be opened in the region below the preamplifier module 200.

The SDD sensor chip 100 and the hybridly integrated preamplifier module 200 can be wire bonded to the holder 300. The holder 300 may be a printed circuit board (PCB). The holder 300 may provide a connection C to a signal output of the hybrid integrated preamplifier 200. The holder 300 may provide further contacts for wire bonding. These further contacts may include but are not limited to contacts 40 (e.g. 40-1, 40-4) for delivering specific drift ring voltages V$_{ring}$ via separate wire bonds. Another contact 42 may provide a connection to ground potential GND.

Figure 3:
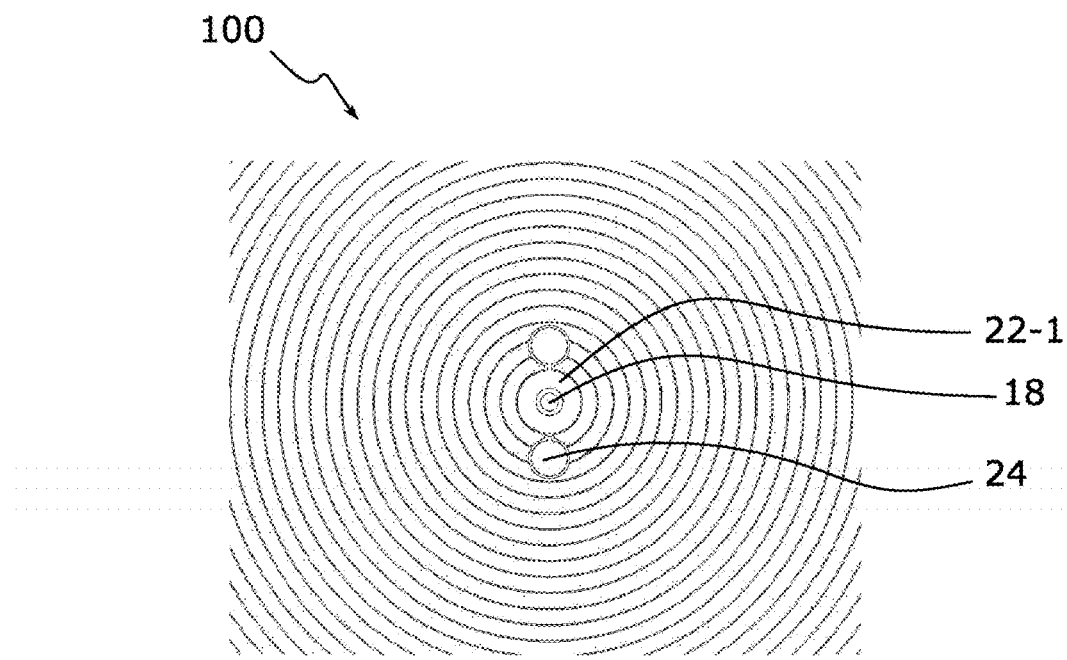
FIG. 3 schematically illustrates the structural layout of an exemplarily SDD sensor chip of the prior art.

FIG. 3 schematically illustrates the structural layout of an exemplarily SDD sensor chip 100 of the prior art. The circular structure of a plurality of drift ring regions 20, specifically the circular structure of drift ring contacts 22-1 formed above, are shown, which at least partly form a closed conductive ring on top of an insulation layer (16, not shown). A drift ring contact 22-1 and a ground contact 24 each provide closely spaced wire bond pads. The contact 18 is completely formed as a wire bond pad on top of the SDD sensor chip 100.

Figure 4:
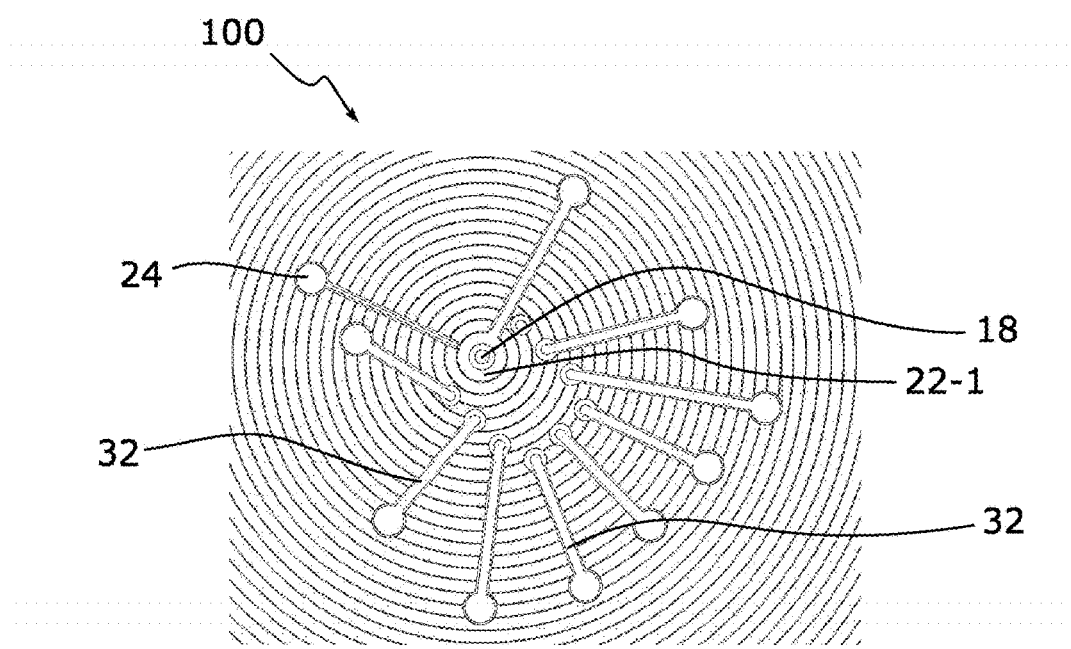
FIG. 4 schematically illustrates the structural layout of an exemplary embodiment of a SDD sensors chip according to the present invention.

FIG. 4 schematically illustrates the structural layout of an exemplary embodiment of an SDD sensor chip 100 according to the present invention. The basic structure corresponds essentially to the structure shown in FIG. 3, therefore the references and their specific assignment is the same.

However, the circuit layout on top of the SDD sensor chip 100 is adapted for flip chip bonding as the contacts are modified to allow hybrid integration with a preamplifier module 200 directly on top of the insulation layer (16, not shown). In particular, to reduce the electric capacitance of the connection (A) to the preamplifier, the signal input of the preamplifier is directly connected to the signal output of the SDD sensor chip 100 at the contact 18 in the centre of the SDD sensor chip 100. Further contacts of the preamplifier module 200 are distantly spaced by electrically conductive paths 32, wherein first ends of the electrically conductive paths 32 are formed for flip chip bonding and second ends of the electrically conductive paths 32 are formed for wire bonding. For allowing a simplified wire bond process, the second ends the electrically conductive paths 32 may provide wire bond pads that are larger in size as the typical wire bond pads on SDD sensor chips 100 and preamplifiers modules 200 of the prior art. Most of the drift ring contacts 22 form a conductive ring on top of the insulation layer (16, not shown), however, below the region where the preamplifier module 200 is to be connected, the corresponding drift ring contacts 22 are opened in the region below the preamplifier module 200.

REFERENCE LIST

10 chip substrate (preferably n$^-$-doped)
12 contact layer (preferably p$^+$-doped cathode layer)
14 contact region (preferably n$^+$-doped anode region)
16 insulation layer (preferably a dielectric layer, e.g. SiO$_2$, SI$_3$N$_4$, Al$_2$O$_3$, TiO$_2$ or ZrO$_2$)
18 contact (preferably a metal contact, e.g. an Al, Ag, Cu or Au contact)
20 drift ring regions (preferably p$^+$-doped, preferably ring- or drop-shaped)
22 drift ring contact (preferably a metal contact, e.g. an Al, Ag, Cu or Au drift ring contact)
24 GND contact
30 metal bumps
32 electrically conductive paths
50 GND (ground potential)
52 V$_{ring}$ (drift ring voltage)
100 sensor chip
200 preamplifier module
300 holder (preferably a printed circuit board, PCB)
A connection to the preamplifier
B connection to a drift ring voltage (V$_{ring}$)
c connection to external electronics
D connection to ground potential (GND)

The invention claimed is:
1. Hybrid integrated silicon drift detector, HiSDD, comprising:
a silicon drift detector, SDD, sensor chip with a first surface configured to be exposed to incident radiation and with a second surface opposite the first surface, wherein a contact region and a plurality of drift ring regions are arranged in the second surface of the sensor chip, the contact region being spaced apart from and forming a common central region for the drift ring regions, wherein a contact is formed above the contact region, is electrically conductively connected to the contact region and is configured for flip chip bonding, and wherein electrically conductive paths are formed on the second surface, are isolated from the contact region and the drift ring regions, and having first ends configured for flip chip bonding and second ends configured for wire bonding;

a preamplifier module having contacts disposed on a surface of the preamplifier module, wherein the first ends of the electrically conductive paths and the contact are flip chip bonded to the contacts of the preamplifier module;

an insulation layer covering second surface of the SDD sensor chip, wherein the contact electrically conductively connect to the contact region through an opening in the insulation layer and wherein the electrically conductive paths are formed above the insulation layer; and at least one drift ring contact formed above the insulation layer, wherein drift ring contacts are electrically conductively connected to corresponding drift ring regions through second openings in the insulation layer, wherein at least one drift ring contact includes an electrically conductive path formed on top of the insulation layer.

2. The HiSDD of claim 1, further comprising a holder configured for supporting the SDD sensor chip, wherein the second ends of the electrically conductive paths are wire bonded to contact areas on the holder.

3. The HiSDD of claim 1, wherein the SDD sensor chip comprises a chip substrate of a semiconductor material with a first doping type, the chip substrate being a n⁻-doped semiconductor material.

4. The HiSDD of claim 3, wherein the contact region is highly doped with the first doping type, the contact region being n⁺-doped; and the plurality of drift ring regions are doped with a second doping type, the plurality of drift ring regions being p⁺-doped.

5. The HiSDD of claim 3, wherein the SDD sensor chip further comprises a contact layer on a first surface of the chip substrate corresponding to the first surface of the SDD chip, wherein the contact layer is doped with a second doping type, the contact layer being p⁺-doped.

6. The HiSDD of claim 1, wherein a first input FET of the preamplifier module is matched to the stray capacitance of the connection to the preamplifier.

7. The HiSDD of claim 1, wherein the preamplifier module comprises a temperature sensor.

8. The HiSDD of claim 1, wherein the at least one drift ring contact forms a conductive ring on top of the insulation layer.

9. The HiSDD of claim 8, wherein at least one conductive ring is opened in the region below the preamplifier module.

10. An HiSDD module, comprising (a) a HiSDD comprising:

a silicon drift detector, SDD, sensor chip with a first surface configured to be exposed to incident radiation and with a second surface opposite the first surface, wherein a contact region and a plurality of drift ring regions are arranged in the second surface of the sensor chip, the contact region being spaced apart from and forming a common central region for the drift ring regions, wherein a contact is formed above the contact region, is electrically conductively connected to the contact region and is configured for flip chip bonding, and wherein electrically conductive paths are formed on the second surface, are isolated from the contact region and the drift ring regions, and having first ends configured for flip chip bonding and second ends configured for wire bonding;

a preamplifier module having contacts disposed on a surface of the preamplifier module, wherein the first ends of the electrically conductive paths and the contact are flip chip bonded to the contacts of the preamplifier module; and a holder configured for supporting the SDD sensor chip, wherein the second ends of the electrically conductive paths are wire bonded to contact areas on the holder;

an insulation layer covering the second surface of the SDD sensor chip, wherein the contact is electrically conductively connected to the contact region through an opening in the insulation layer and wherein the electrically conductive paths are formed above the insulation layer; and at least one drift ring contact formed above the insulation layer, wherein drift ring contacts are electrically conductively connected to corresponding drift ring regions through second openings in the insulation layer, wherein at least one drift ring contact includes an electrically conductive path formed on top of the insulation layer; and (b) a thermoelectric cooler thermally connected to the holder.

11. The HiSDD module according to claim 10, further comprising a circular entrance aperture for X-ray radiation, wherein the centre of the entrance aperture is located above the contact region.

12. A method for fabricating a hybrid integrated silicon drift detector, HISDD, comprising:

a silicon drift detector, SDD, sensor chip with a first surface configured to be exposed to incident radiation and with a second surface opposite the first surface, wherein a contact region and a plurality of drift ring regions are arranged in the second surface of the sensor chip, the contact region being spaced apart from and forming a common central region for the drift ring regions, wherein a contact is formed above the contact region, is electrically conductively connected to the contact region and is configured for flip chip bonding, and wherein electrically conductive paths are formed on the second surface, are isolated from the contact region and the drift ring regions, and having first ends configured for flip chip bonding and second ends configured for wire bonding;

a preamplifier module having contacts disposed on a surface of the preamplifier module, wherein the first ends of the electrically conductive paths and the contact are flip chip bonded to the contacts of the preamplifier module;

an insulation layer covering the second surface of the SDD sensor chip, wherein the contact is electrically conductively connected to the contact region through an opening in the insulation layer and wherein the electrically conductive paths are formed above the insulation layer, and at least one drift ring contact formed above the insulation layer, wherein drift ring contacts are electric ally conductively connected to corresponding drift ring regions through second openings in the insulation layer, wherein at least one drift ring contact includes an electrically conductive path formed on top of the insulation layer the method comprising the steps of:
providing the silicon drift detector, SDD, sensor chip;
providing the preamplifier module;
flip chip bonding the first ends of the electrically conductive paths and the contact to the contacts of the preamplifier module.

13. The method according to claim 12 for fabricating a HiSDD which further comprises a holder configured for supporting the SDD sensor chip, wherein the second ends of the electrically conductive paths are wire bonded to contact areas on the holder, the method further comprising the step of:
wire bonding the second ends of the electrically conductive paths to contact areas on the holder.

* * * * *